United States Patent
Kim

(10) Patent No.: US 9,538,073 B2
(45) Date of Patent: Jan. 3, 2017

(54) CONTROLLING DEVICE AND METHOD OF VEHICLE CAMERA

(71) Applicant: MANDO CORPORATION, Pyeongtaek-si (KR)

(72) Inventor: Kyong Won Kim, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 238 days.

(21) Appl. No.: 14/316,510

(22) Filed: Jun. 26, 2014

(65) Prior Publication Data

US 2015/0189172 A1    Jul. 2, 2015

(30) Foreign Application Priority Data

Dec. 27, 2013    (KR) .................. 10-2013-0165319

(51) Int. Cl.
| | |
|---|---|
| H04N 7/18 | (2006.01) |
| H04N 5/232 | (2006.01) |
| G06T 7/00 | (2006.01) |
| H04N 21/234 | (2011.01) |
| H04N 5/217 | (2011.01) |
| B60S 1/08 | (2006.01) |

(52) U.S. Cl.
CPC ......... *H04N 5/23229* (2013.01); *G06T 7/0083* (2013.01); *H04N 5/217* (2013.01); *H04N 7/183* (2013.01); *H04N 21/23418* (2013.01); *B60S 1/0844* (2013.01); *G06T 2207/10004* (2013.01); *G06T 2207/20224* (2013.01); *G06T 2207/30252* (2013.01)

(58) Field of Classification Search
CPC ... H04N 5/23229; G06T 7/0083; G06T 7/183; G06T 2207/10004; G06T 2207/20224; G06T 2207/30252
See application file for complete search history.

(56) References Cited

U.S. PATENT DOCUMENTS

| | | | |
|---|---|---|---|
| 2002/0181240 A1* | 12/2002 | Holz ................ | B60Q 1/14 362/487 |
| 2011/0043624 A1* | 2/2011 | Haug ............... | G06K 9/00791 348/135 |
| 2014/0169695 A1* | 6/2014 | Lin .................. | G06T 5/005 382/275 |

FOREIGN PATENT DOCUMENTS

| JP | H08-072641 | 3/1996 |
|---|---|---|
| JP | 2006-107314 | 4/2006 |

OTHER PUBLICATIONS

Office Action dated Apr. 11, 2016 for German Patent Application No. 10 2014 009 644.0 and its English translation by Google Translate.

* cited by examiner

*Primary Examiner* — Tat Chio
(74) *Attorney, Agent, or Firm* — Ladas & Parry, LLP

(57) ABSTRACT

A control device for a vehicle camera may include: a wiper relay connected to a multi-function switch to operate a vehicle wiper at a predetermined cycle; a camera controller connected to the wiper relay, and synchronizing the operation cycle of the wiper with an imaging cycle of the vehicle camera such that the vehicle camera images the front of the vehicle according to the operation period of the wiper; and an image filter connected to the camera controller, estimating the position of the wiper from edge information of the images taken by the camera, and searching and removing the wiper in the taken images.

8 Claims, 2 Drawing Sheets

CONTROLLING DEVICE AND METHOD OF VEHICLE CAMERA

CROSS-REFERENCE(S) TO RELATED APPLICATIONS

This application claims priority to Korean Patent Application No. 10-2013-0165319, filed on Dec. 27, 2013, the disclosure of which is incorporated herein by reference in its entirety.

BACKGROUND OF THE INVENTION

Field of the Invention

Exemplary embodiments of the present invention relate to a controlling device and method of a vehicle camera, and more particularly, to a controlling device and method of a vehicle camera, which is capable of handling a situation in which it is difficult acquire an image due to a wiper operation of the vehicle in case of bad weather.

Description of the Related Art

When a vehicle camera takes images while a wiper is operated due to an external factor such as rain or snow, the quality of the images may be degraded by interference of the wiper operation or the rain or snow in the images.

The operation of the conventional vehicle camera is set in a fixed mode or an automatic mode (exposure, gain and the like) depending on external illuminance. Thus, when the above-described external factor occurs, the performance of a front-view camera system cannot be stably secured.

In particular, when an external factor occurs in the fixed mode, the operation of an intelligent driver assistance system may be limited in a situation where the stability of a driver is required due to the operation of the wiper.

In the automatic mode, the camera may be controlled depending on the external illuminance, and thus provide an image of which the quality is improved more than in the fixed mode. Under the condition where the external illuminance is hardly changed, however, the camera may not properly handle a situation in which an external factor such as the amount of rain or the operation speed of the wiper is changed.

From the above-described point of view, Japanese Patent Laid-open Publication No. H08-72641 has disclosed an image recognizing device for vehicle, which includes an imaging control unit to prevent the reception of image signals during a period of time corresponding to the operation of a wiper, in order to secure the precision of image information. In such an image recognizing device, however, since the imaging control unit prevents the reception of image signals during the period of time corresponding to the operation of the wiper, the input image information is inevitably limited.

SUMMARY OF THE INVENTION

The present invention has been made in view of the above problems, and it is an object of the present invention to provide a control device of a vehicle camera, which is capable of handling a situation in which it is difficult to acquire an image due to a wiper operation of a vehicle in case of bad weather.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a control device for a vehicle camera may include: a wiper relay connected to a multi-function switch to operate a vehicle wiper at a predetermined cycle; a camera controller connected to the wiper relay, and synchronizing the operation cycle of the wiper with an imaging cycle of the vehicle camera such that the vehicle camera images the front of the vehicle according to the operation period of the wiper; and an image filter connected to the camera controller, estimating the position of the wiper from edge information of the images taken by the camera, and searching and removing the wiper in the taken images.

In accordance with another aspect of the present invention, a control method of a vehicle camera may include: manipulating a multi-function switch to operate a wiper connected to a wiper relay at a predetermined cycle; synchronizing, by a camera controller connected to the vehicle camera, an imaging operation of the vehicle camera to image the front of the vehicle with the operation of the wiper; and searching and removing, by an image filter connected to the camera controller, the wiper in the images taken by the camera through edge information of the taken images, based on the estimated position of the wiper.

In the synchronizing of the imaging operation of the vehicle camera with the operation of the wiper, an imaging cycle at which the vehicle camera images the front of the vehicle may be synchronized with an operation period in which the wiper reciprocates on the front windshield glass of the vehicle and a suspension period in which the operation of the wiper is suspended after the operation period.

In the synchronizing of the imaging operation of the vehicle camera with the operation of the wiper, the time during which the vehicle camera images the front of the vehicle may be equal to the sum total of a first imaging period corresponding to 1/n multiple of the time required for the operation period in which the wiper reciprocates on the front windshield of the vehicle and a second imaging period corresponding to 1/n multiple of the time required for the suspension period in which the operation of the wiper is suspended after the operation period, where n is a positive integer equal to or larger than 2, and the position of the wiper may be estimated through image information based on the sum total.

The searching and removing of the wiper in the taken images may include: estimating the position of the wiper, based on ½ cycle of a reciprocation signal transmitted to the wiper from the wiper relay, that is, the cycle at which the wiper is moved from the left side to the right side or from the right side to the left side; and setting the estimated position of the wiper to a region of interest when the position of the wiper is estimated, and removing the wiper in the taken images while extracting an edge within the region of interest.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The advantages and features of the present invention and a method for achieving the advantages and features will be clarified through embodiments which are described below with reference to the accompanying drawings.

However, the present invention is not limited to the embodiments, but may be embodied into another form.

The embodiments disclosed herein may be provided to make the disclosure thorough and perfect and to sufficiently deliver the spirit of the present invention to those skilled in the art.

The terms used in the present specification are used to describe only specific embodiments, and do not limit the present invention.

Hereafter, exemplary embodiments of the present invention will be described below in more detail with reference to the accompanying drawings.

Figure 1:
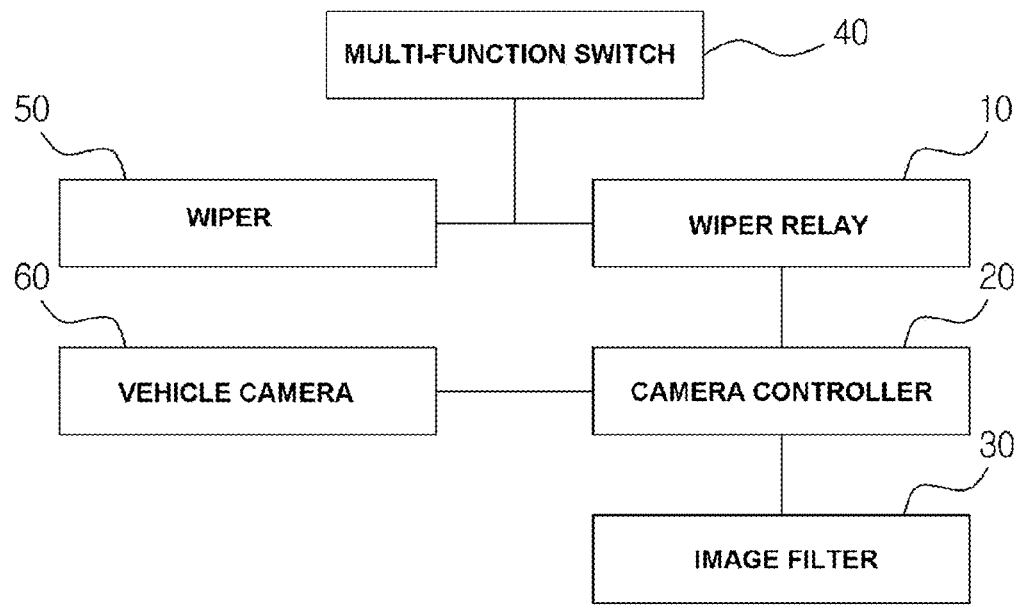
FIG. 1 is a block diagram illustrating a control device of a vehicle camera according to an embodiment of the present invention.
Figure 2:
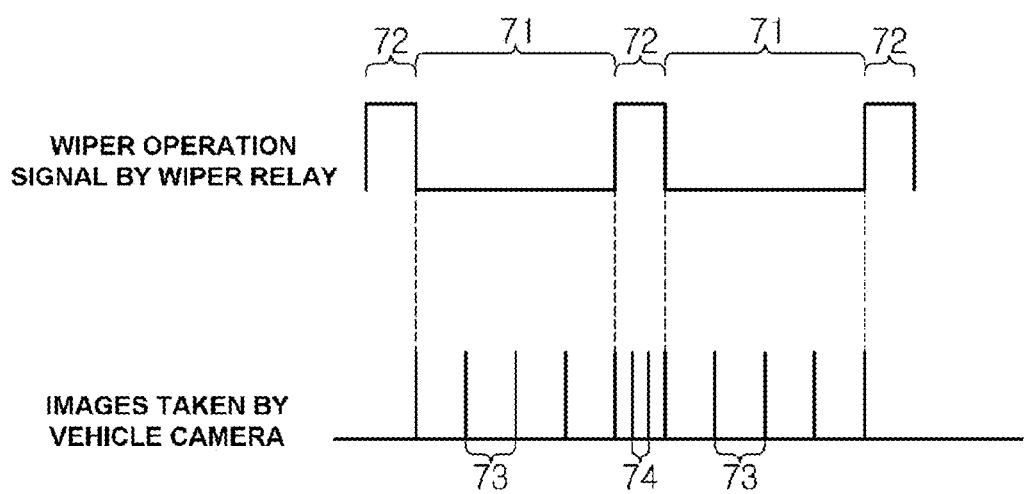
FIG. 2 is a flowchart illustrating a control method of a vehicle camera according to an embodiment of the present invention.
Figure 3:
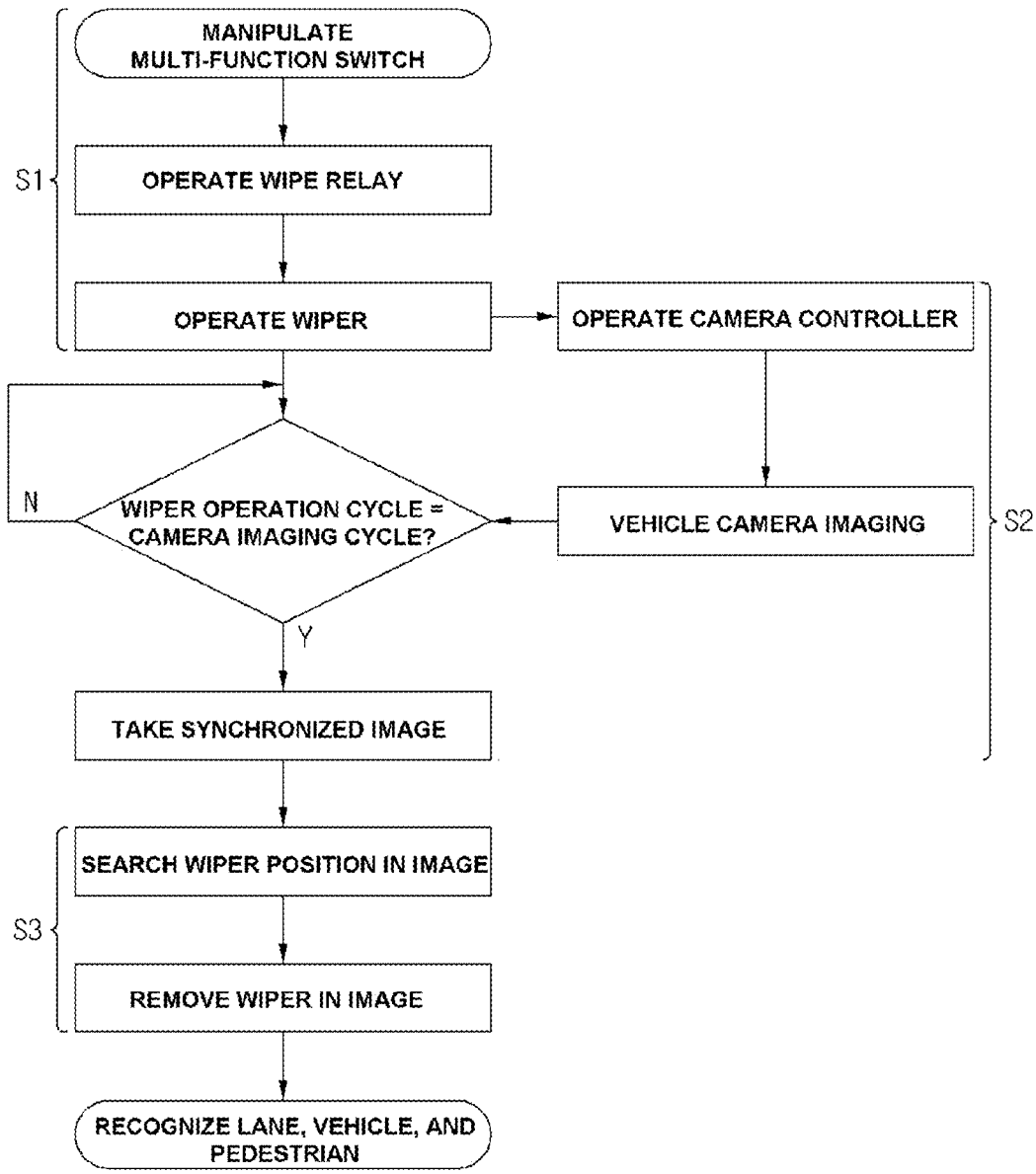
FIG. 3 is a diagram illustrating that a wiper operation signal of a wiper relay is synchronized with an imaging period of the vehicle camera.

FIG. 1 is a block diagram illustrating a control device of a vehicle camera according to an embodiment of the present invention. FIG. 2 is a flowchart illustrating a control method of a vehicle camera according to an embodiment of the present invention. FIG. 3 is a diagram illustrating that a wiper operation signal of a wiper relay is synchronized with an imaging period of the vehicle camera.

As illustrated in FIG. 1, the control device of a vehicle camera according to the embodiment of the present invention may include a wiper relay 10, a camera controller 20, and an image filter 30.

The wiper relay 10 is connected to a multi-function switch 40 to operate a vehicle wiper 50 at a predetermined cycle.

The camera controller 20 is connected to the wiper relay 10, and synchronizes the operation cycle of the wiper 50 with the imaging cycle of the vehicle camera 60 such that the vehicle camera 60 images the front of the vehicle according to the operation cycle of the wiper 50.

The image filter 30 is connected to the camera controller 20, estimates the position of the wiper 50 from edge information of the images taken by the camera 60, and searches and removes the wiper 50 in the taken images.

The image filter 30 may recognize the operation of the wiper 50 in the images taken by the vehicle camera 60 as a signal, when an external factor such as rain or snow occurs.

The operation cycle of the wiper 50 needs to be matched with the imaging cycle of the vehicle camera 60 as illustrated in FIG. 3. However, when the operation cycle of the wiper 50 is not matched with the imaging cycle of the vehicle camera 60, the position and existence of the wiper 50 within the images taken by the vehicle camera 60 are continuously changed.

When the amount of rain or snow is changed to vary the operation cycle of the wiper 50, it is more difficult to predict the interference of the wiper 50 within the images taken by the vehicle camera 60.

Thus, as illustrated in FIG. 3, the image filter 30 may determine that the synchronization is not achieved, when first and second imaging periods 73 and 74 are not in a multiple relationship with an operation period 71 and a suspension period 72 and exceed a predetermined reference value. The first and second imaging periods 73 and 74, the operation period 71, and the suspension period 72 will be described below.

That is, the image filter 30 receives the operation signal of the vehicle camera 60 by the camera controller 20, the state information of the multi-function switch 40, and the information of the wiper relay 10 and the like, and comprehensively analyzes the synchronization.

Therefore, the control device of a vehicle camera according to the embodiment of the present invention may provide clearer, more precise, and more reliable image information to a driver and a passenger.

A process of editing images from the control device according to the embodiment of the present invention will be described as follows.

At first step S1, the multi-function switch 40 is manipulated to operate the wiper 50 connected to the wiper relay 10 at a predetermined cycle.

At second step S2, the camera controller 20 connected to the vehicle camera 60 synchronizes an imaging operation of the vehicle camera 60 to image the front of the vehicle with the operation of the wiper 50.

At third step S3, the image filter 30 connected to the camera controller 20 searches and removes the wiper 50 in the images taken by the camera through edge information of the images, based on the estimated position of the wiper 50.

Referring to FIG. 3, the operation cycle at which the vehicle camera 60 images the front of the vehicle is synchronized with the operation period 71 in which the wiper 50 reciprocates on the front windshield glass of the vehicle and the suspension period 72 in which the wiper 50 is suspended after the operation period 71.

That is, the imaging time of the vehicle camera to image the front of the vehicle may correspond to the sum total of the first imaging period 73 and the second imaging period 74. The first imaging period 73 may correspond to 1/n multiple of the time required for the operation period 71 during which the wiper 50 reciprocates on the front windshield glass of the vehicle, and the second imaging period 74 may correspond to 1/n multiple of the time required for the suspension period 72 during which the operation of the wiper 50 is suspended after the operation period 71, where n is a positive integer equal to or larger than 2.

Thus, the position of the wiper 50 may be estimated from the image information based on the above-described sum total.

At the third step S3, the image editing is performed through the following process.

First, the position of the wiper 50 is estimated on the basis of ½ cycle of a reciprocation signal transmitted to the wiper 50 from the wiper relay 10, that is, the cycle at which the wiper 50 is moved from the left side to the right side or from the right side to the left side.

When the position of the wiper 50 is estimated, the estimated position of the wiper 50 is set to a region of interest. Then, while an edge is extracted within the region of interest, the wiper 50 is removed from the taken images.

According to the control device and method of a vehicle camera, the camera controller may synchronize the imaging cycle of the vehicle camera with the operation cycle of the wiper, and the image filter may estimate the position of the wiper from the taken images and remove the wiper in the taken image. Therefore, clearer, more precise, and more reliable image information may be provided to a driver and a passenger.

While the present invention has been described with respect to the specific embodiments, it will be apparent to those skilled in the art that various changes and modifications may be made without departing from the spirit and scope of the invention as defined in the following claims.

What is claimed is:

1. A control method of a vehicle camera, comprising:
   manipulating a multi-function switch to operate a wiper connected to a wiper relay at a predetermined cycle;
   synchronizing, by a camera controller connected to the vehicle camera, an imaging operation of the vehicle camera to image the front of the vehicle with the operation of the wiper;
   estimating, by an image filter connected to the camera controller, a position of the wiper based on a cycle of the operation of the wiper; and
   when the position of the wiper is estimated, setting, by the image filter, the estimated position of the wiper as a region of interest, and removing the wiper in an image taken by the vehicle camera by extracting an edge within the region of interest.

2. The control method according to claim 1, wherein in the synchronizing of the imaging operation of the vehicle camera with the operation of the wiper,
   an imaging cycle at which the vehicle camera images the front of the vehicle is synchronized with an operation period in which the wiper reciprocates on the front windshield glass of the vehicle and a suspension period in which the operation of the wiper is suspended after the operation period.

3. The control method according to claim 1, wherein in the synchronizing of the imaging operation of the vehicle camera with the operation of the wiper,
   the time during which the vehicle camera images the front of the vehicle is equal to the sum total of a first imaging period corresponding to 1/n multiple of the time required for the operation period in which the wiper reciprocates on the front windshield of the vehicle and a second imaging period corresponding to 1/n multiple of the time required for the suspension period in which the operation of the wiper is suspended after the operation period, where n is a positive integer equal to or larger than 2, and
   the position of the wiper is estimated through image information based on the sum total.

4. The control method according to claim 1, wherein the cycle of the operation of the wiper is a
   ½ cycle of a reciprocation signal transmitted to the wiper from the wiper relay, or a cycle at which the wiper is moved from the left side to the right side or from the right side to the left side.

5. A control device for a vehicle camera, comprising:
   a wiper relay connected to a multi-function switch to operate a vehicle wiper at a predetermined cycle;
   a camera controller connected to the wiper relay, and synchronizing the operation cycle of the wiper with an imaging cycle of the vehicle camera such that the vehicle camera images the front of the vehicle according to the operation period of the wiper; and
   an image filter connected to the camera controller, estimating a position of the wiper based on the operation cycle, setting the estimated position of the wiper as a region of interest, and removing the wiper in an image taken by the vehicle camera by extracting an edge within the region of interest.

6. The control device of claim 5, wherein the camera controller synchronizes the imaging cycle at which the vehicle camera images the front of the vehicle with the operation period in which the wiper reciprocates on the front windshield glass of the vehicle and a suspension period in which the operation of the wiper is suspended after the operation period.

7. The control device of claim 5, wherein the camera controller controls so that the time during which the vehicle camera images the front of the vehicle is equal to the sum total of a first imaging period corresponding to 1/n multiple of the time required for the operation period in which the wiper reciprocates on the front windshield of the vehicle and a second imaging period corresponding to 1/n multiple of the time required for the suspension period in which the operation of the wiper is suspended after the operation period, where n is a positive integer equal to or larger than 2, and the position of the wiper is estimated through image information based on the sum total.

8. The control device of claim 5, wherein the operation cycle is a ½ cycle of a reciprocation signal transmitted to the wiper from the wiper relay, or a cycle at which the wiper is moved from a left side to a right side or from the right side to the left side.

* * * * *